(12) United States Patent
Sorsby

(10) Patent No.: US 8,149,742 B1
(45) Date of Patent: Apr. 3, 2012

(54) SYSTEM AND METHOD FOR RECEIVING AND TRANSMITTING SIGNALS

(75) Inventor: William B. Sorsby, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 244 days.

(21) Appl. No.: 12/493,100

(22) Filed: Jun. 26, 2009

(51) Int. Cl.
*H04B 7/005* (2006.01)

(52) U.S. Cl. ....... 370/278; 370/297; 370/219; 455/11.1; 455/25; 455/121

(58) Field of Classification Search .................. None
See application file for complete search history.

(56) References Cited

U.S. PATENT DOCUMENTS

| | | | |
|---|---|---|---|
| 4,963,945 A | 10/1990 | Cooper et al. | |
| 6,194,980 B1 | 2/2001 | Thon | |
| 6,549,560 B1 * | 4/2003 | Maiuzzo et al. | 375/136 |
| 7,873,116 B2 * | 1/2011 | Okada et al. | 375/295 |
| 2003/0045244 A1 * | 3/2003 | Lindemann et al. | 455/82 |
| 2010/0197231 A1 * | 8/2010 | Kenington | 455/63.1 |

* cited by examiner

*Primary Examiner* — Kibrom T Hailu

(74) *Attorney, Agent, or Firm* — Donna P. Suchy; Daniel M. Barbieri

(57) ABSTRACT

A diplexer for steering transmit and receive signals between an antenna and a transmitter and receiver of a radio frequency communication system. The diplexer includes a first quadrature hybrid device configured for bidirectional communication with the antenna and configured for rerouting transmission signals from the transmitter. The diplexer also includes at least one pair of filters coupled to quadrature ports of the quadrature hybrid device. The at least one pair of filters provides a receive signal from the antenna via the quadrature hybrid device through a receive path and routes a transmit signal from the transceiver via the quadrature hybrid device through a transmit path. The at least one filter pair is configured to filter out noise from the receive signal and to reflect the transmit signal energy while allowing noise through from the transmit signal. The diplexer also includes a second quadrature hybrid device configured to receive an output from each of the at least one pair of filters. The second quadrature hybrid device provides the filtered receive signal to the receiver or the noise from the transmit signal to a load. Fast frequency hopping is supported by switching between pairs of filters, which allows the transmitter and receiver to operate across multiple frequencies by hopping from one frequency to another.

20 Claims, 11 Drawing Sheets

SYSTEM AND METHOD FOR RECEIVING AND TRANSMITTING SIGNALS

BACKGROUND

The present disclosure relates generally to the field of receiving and transmitting signals and more specifically to a diplexer and diplex method for steering wireless receive signals and signals for wireless transmission.

Receive-while-transmit operations for a frequency agile communication system (e.g., wireless communication system such as a radio frequency (RF) system) conventionally include significant system performance compromises in size, receiver sensitivity, transmitter power-efficiency, and frequency hopping speed. Conventional diplexers for full-duplex operation impose significant performance penalties, such as inefficient use of power, occupying large volume, and/or limiting bandwidth.

Historically, simplex operation has more frequently been employed instead of duplex operation. System costs associated with conventional diplexers/duplexers have been very high. High-speed data system proliferation in recent years may have changed the cost equation and greater emphasis can be placed on full-duplex capability. Looking forward, full-duplex capability may become standard for many more RF systems.

A diplexer may be used for separating a receive signal from a transmit signal and conventionally has a large volume or size when the transmit power is significant. A smaller diplexer conventionally has greater losses in both the transmit and receive paths due to a low quality factor (Q factor) of circuit elements. Low Q circuits have higher power dissipation relative to the operating frequency than in the larger diplexer and thus requiring the transmitter to produce more power. Frequency agility conventionally requires switching the diplexer frequencies of operation, introducing significant additional losses in both transmit and receive paths. High-speed frequency agility greatly compounds these issues.

One issue of conventional receive-while-transmit operations is the need to isolate the receiver input from the transmitted signal. The receiver input must provide sufficient filtering to reduce the strong transmit signal to a sufficiently low level to prevent overload of subsequent amplifiers. This isolation filtering is one function of a conventional diplexer.

Another issue of conventional receive-while-transmit operations is the need for noise from the transmitter to be reduced to near thermal background levels at the receiver or low noise amplifier (LNA) input. In most cases, due to antenna voltage standing wave ratio (VSWR) concerns, this requires that the power amplifier (PA) output be filtered to near background thermal noise levels because any isolating device between the PA and the receiver (e.g., a circulator) may fail to provide isolation when the undesired signal comes back directly from the antenna. Even modest VSWR levels, which cause little concern for the transmitter, may reflect noise and spurious signals within the receive band and degrade receiver performance. Conventional solutions to this problem have been to use separate receive and transmit antennas or to install very large diplexer filters to eliminate any noise present at the output of the transmitter/PA from being injected into the receiver front-end.

What is needed is a system and method having full-duplex capability while having low-loss transmission and low-noise receive operations What is also needed is a diplexer and diplex method having improved transmit and receive performance while reducing circuit size and cost. What is further needed is a diplex system and method for isolating the receiver input from the transmitted signal while reducing circuit size and cost. What is needed further still is a diplex system and method for reducing noise from the transmitter to near thermal background levels at the receiver or amplifier while reducing circuit size and cost.

SUMMARY

One embodiment of the disclosure relates to a diplexer for steering transmit and receive signals between an antenna and a transmitter and receiver of a radio frequency communication system. The diplexer includes a first quadrature hybrid device configured for bidirectional communication with the antenna and configured for routing transmission signals from the transceiver. The diplexer also includes at least one pair of filters coupled to quadrature ports of the quadrature hybrid device. The at least one pair of filters provides a receive signal from the antenna via the quadrature hybrid device for a receive path and reflects a transmit signal from the transmitter via the quadrature hybrid device for a transmit path. The at least one pair of filters is configured to filter out noise from the receive signal and allow noise through from the transmit signal. The diplexer also includes a second quadrature hybrid device configured to receive the outputs from each of the at least one pair of filters. The second quadrature hybrid device provides the filtered receive signal to the transceiver or provides the noise from the transmit signal to a load.

Another embodiment of the disclosure relates to an antenna interface unit for multiplexing transmit and receive signals between an antenna and a transmitter and receiver of a radio frequency communication system. The antenna interface unit includes a first quadrature hybrid device configured for bidirectional communication with the antenna and configured for routing transmission signals from the transceiver. The antenna interface unit also includes at least one pair of filters coupled to quadrature ports of the quadrature hybrid device. The at least one pair of filters provides a receive signal from the antenna via the quadrature hybrid device for a receive path and reflects a transmit signal from the transmitter via the quadrature hybrid device for a transmit path. The at least one pair of filters is configured to filter out noise from the receive signal and allow noise through from the transmit signal. The antenna interface unit also includes a second quadrature hybrid device configured to receive the outputs from each of the at least one pair of filters. The second quadrature hybrid device provides the filtered receive signal to the transceiver or provides the noise from the transmit signal to a load.

Another embodiment of the disclosure relates to a full-duplex multiplexer for steering transmit and receive signals between an antenna and a transceiver of a radio frequency communication system. The multiplexer includes a first quadrature hybrid device configured for bidirectional communication with the antenna and configured for routing transmission signals from the transceiver. The multiplexer also includes at least one pair of filters coupled to quadrature ports of the quadrature hybrid device. The at least one pair of filters provides a receive signal from the antenna via the quadrature hybrid device for a receive path and reflects a transmit signal from the transmitter via the quadrature hybrid device for a transmit path. The at least one pair of filters is configured to filter out noise from the receive signal and allow noise through from the transmit signal. The multiplexer also includes a second quadrature hybrid device configured to receive the outputs from each of the at least one pair of filters. The second quadrature hybrid device provides the filtered receive signal to the transceiver or provides the noise from the transmit signal to a load. The total transmit loss is less than 0.3 dB, the total receive loss is less than 0.5 dB, and the volume of the full-duplex multiplexer is less than 2 cubic inches.

DETAILED DESCRIPTION

Figure 1:
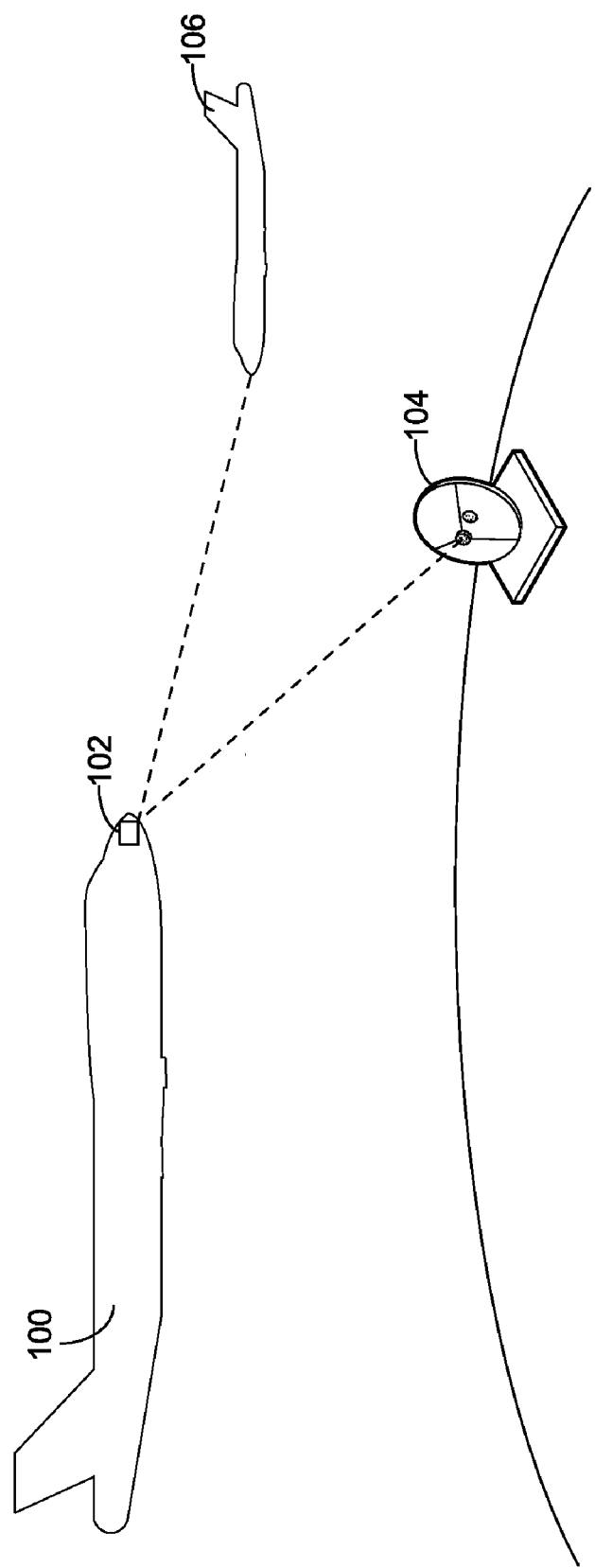
FIG. 1 is an illustration of an aircraft communicating with an airborne and a ground target according to an exemplary embodiment.

Referring to FIG. 1, an aircraft 100 includes a wireless communication system 102 that is configured to communicate with a ground station 104 and/or another aircraft 106 over a wireless communication link according to an exemplary embodiment. The communication may include transmit signals, receive signals, or transmit and receive signals. The wireless communication link may use any RF communication protocol or band of past, present, or future design. According to other exemplary embodiments, aircraft 100 may communicate with objects other than those illustrated, for example ground vehicles, various other types of ground stations, control towers, mobile or handheld communication devices, space vehicles, etc. According to still other exemplary embodiments, the wireless communication link may be formed between any two devices capable of wireless communication and not limited to a link with one device being mounted in an aircraft.

Figure 2:
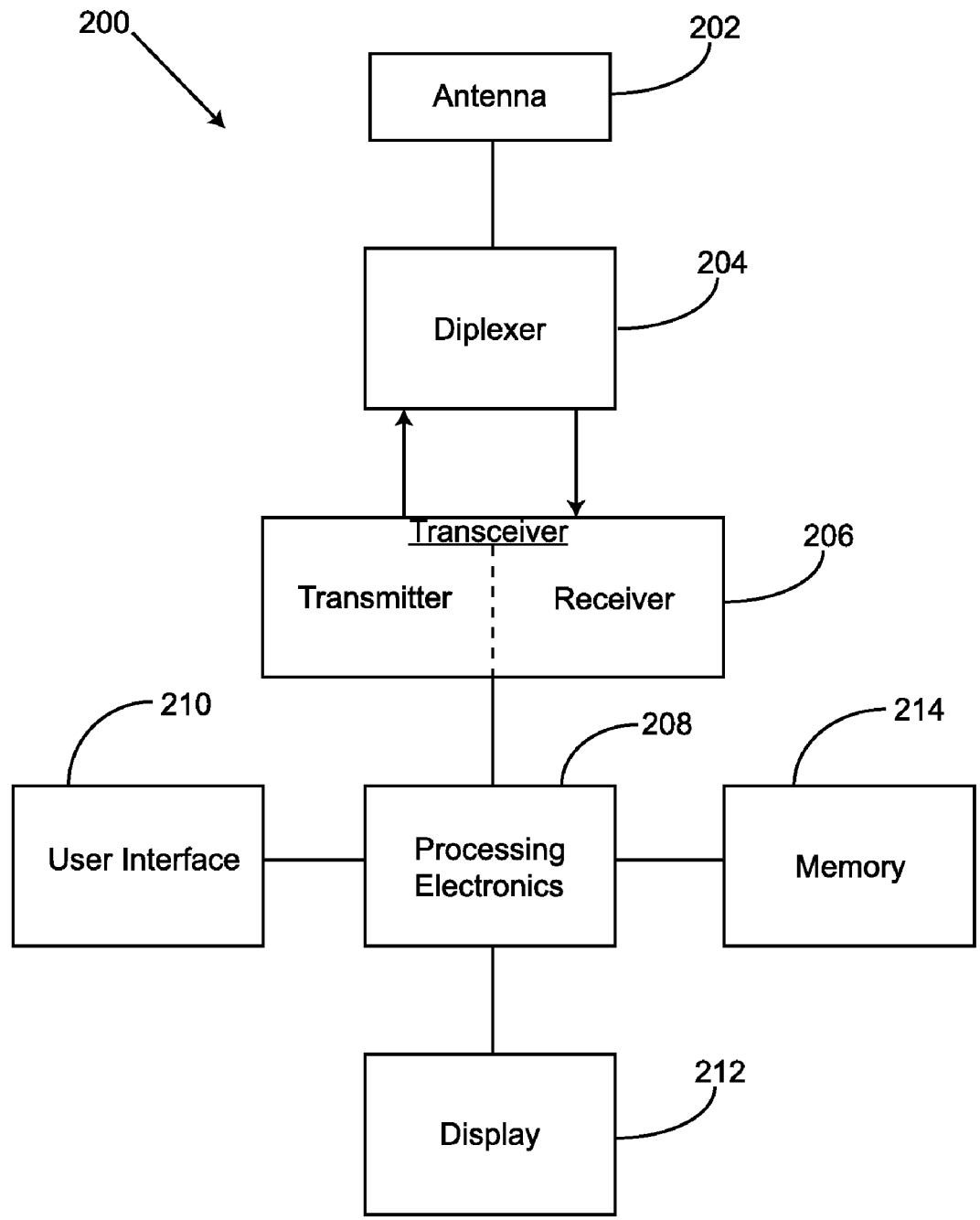
FIG. 2 is a general block diagram of a communication system according to an exemplary embodiment.

Referring to FIG. 2, a block diagram of a communication system 200 (e.g., communication system 102) is illustrated according to an exemplary embodiment. Communication system 200 is configured to communicate over a wireless communications link with a remote system. Communication system 200 generally includes an antenna 202, a diplexer 204, a transceiver 206, processing electronics 208, a user interface 210, a display 212, and a memory 214. Antenna 202 is configured to receive signals from the remote system and transmit signals to the remote system.

Diplexer 204 is configured to perform multiplexing of the transmit and receive signals to/from antenna 202. For purposes of this disclosure, the terms "diplex" and "diplexer" are defined to include any method or device that implements frequency domain multiplexing. According to some exemplary embodiments, diplexer 204 may be configured as a duplexer and combine two or more signals into a common channel or medium, for example to increase transmission efficiency. The duplexer can include a bandpass duplexer, a notch duplexer, and bandpass/band reject (BP/BR) duplexer, etc. The duplexer may be configured to operate in a half-duplex mode (transmit or receive in one direction at a time) and/or a full duplex mode (transmit and receive simultaneously). Various duplex modes may incorporate time-division multiplexing, frequency-division multiplexing, echo cancellation, or any other technique of past, present, or future design. According to alternative embodiments, diplexer 204 may be configured for a simplex mode with transmit/receive in only a single direction. Diplexer 204 can be utilized in various communication or RF applications and is not limited to use with an aircraft.

According to various exemplary embodiments, diplexer/duplexer 204 may use quadrature hybrid devices ("quad-hybrids") and may offer solutions to size and performance issues. The quad-hybrids can be employed for RF power-combining, signal-splitting, and phase-shifting. The quad-hybrids can also used in other areas due to the complex underlying transmission-line theory, because quad-hybrids may effectively accomplish signal routing. According to one exemplary embodiment, signals may be switched with quad-hybrids as described in U.S. Pat. No. 6,194,980, which is herein incorporated by reference in its entirety. Switching with quad-hybrids involves steering signals through coupled transmission lines while subjecting the signal to minimal losses.

Transceiver 206 is configured to both transmit signals (RF signals) using antenna 202 via diplexer 204 and to receive signals from antenna 202 via diplexer 204. Transceiver 206 includes a transmitter and a receiver. Transceiver 206 may include common circuitry comprising both transmit and receive functionality or may include a transmitter and receiver on separate circuitry. Transceiver 206 may also include a power amplifier to amplify transmit signals provided to diplexer 204 and for transmission by antenna 202.

Processing electronics 208 can be any hardware and/or software processor or processing architecture capable of executing instructions. Processing electronics 208 may be configured for determining data to transmit via transceiver 206 and of determining how to process data received from transceiver 206. Processing electronics 208 may be further configured to retrieve data from memory 214, receive commands from a user via user interface 210, and render data for graphical output to display 212. Processing of data received from or provided to transceiver 206 may be based on input from user interface 210 (e.g., oral command, tactile interface, etc.) or memory 214 (any volatile or non-volatile memory).

Processing electronics 208 may provide graphical representations of data received by transceiver 206, data to be transmitted via transceiver 206, commands input at user interface 210, etc. Processing electronics 208 may include a display driver that can be any computer hardware and/or software that enables display 212 to communicate with and receive data from various other components.

Display 212 may be any electronic display capable of providing graphical representations to a user. In aircraft applications (e.g., in aircraft 100), display 212 may also be used to display information from navigational equipment, a terrain system, a weather radar system, etc. In alternative exemplary embodiments, user interface 210 can be integral with display 212 as a touchscreen.

Figure 3:
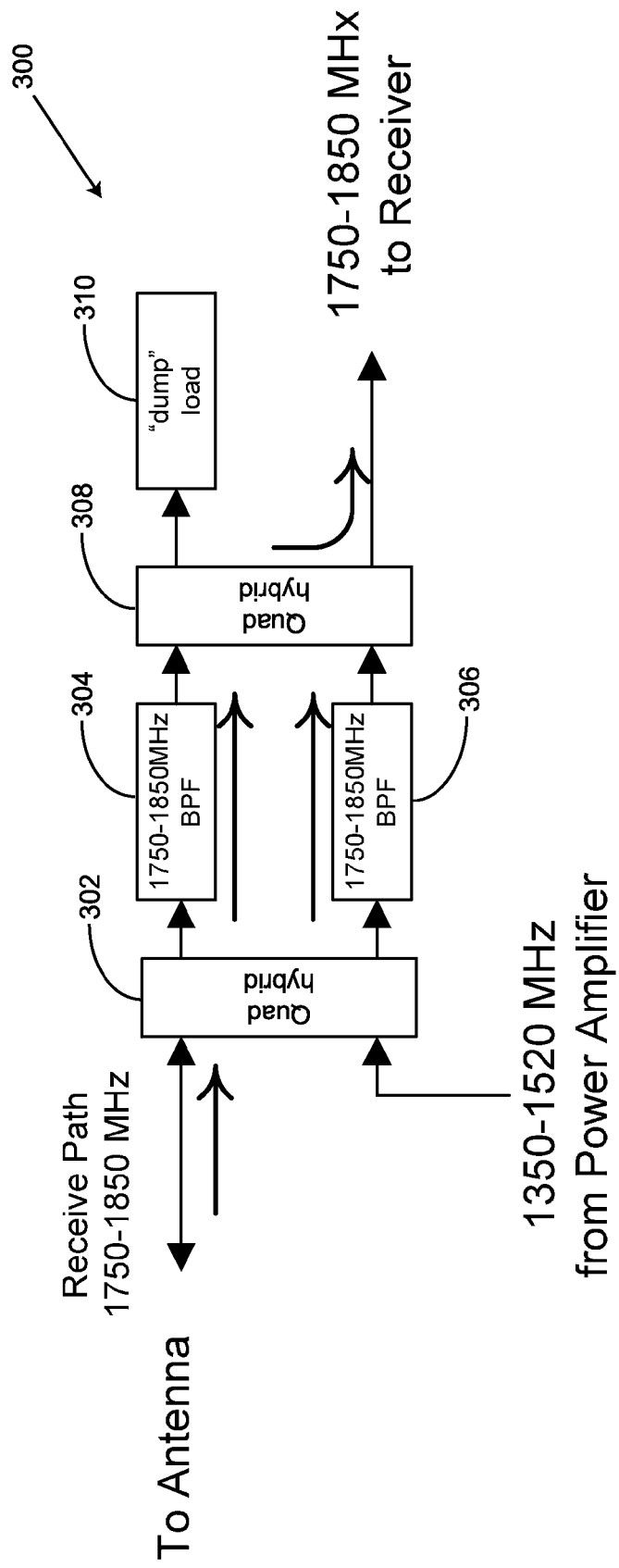
FIG. 3 is a schematic diagram of a diplexer illustrating a receive path according to an exemplary embodiment.
Figure 4:
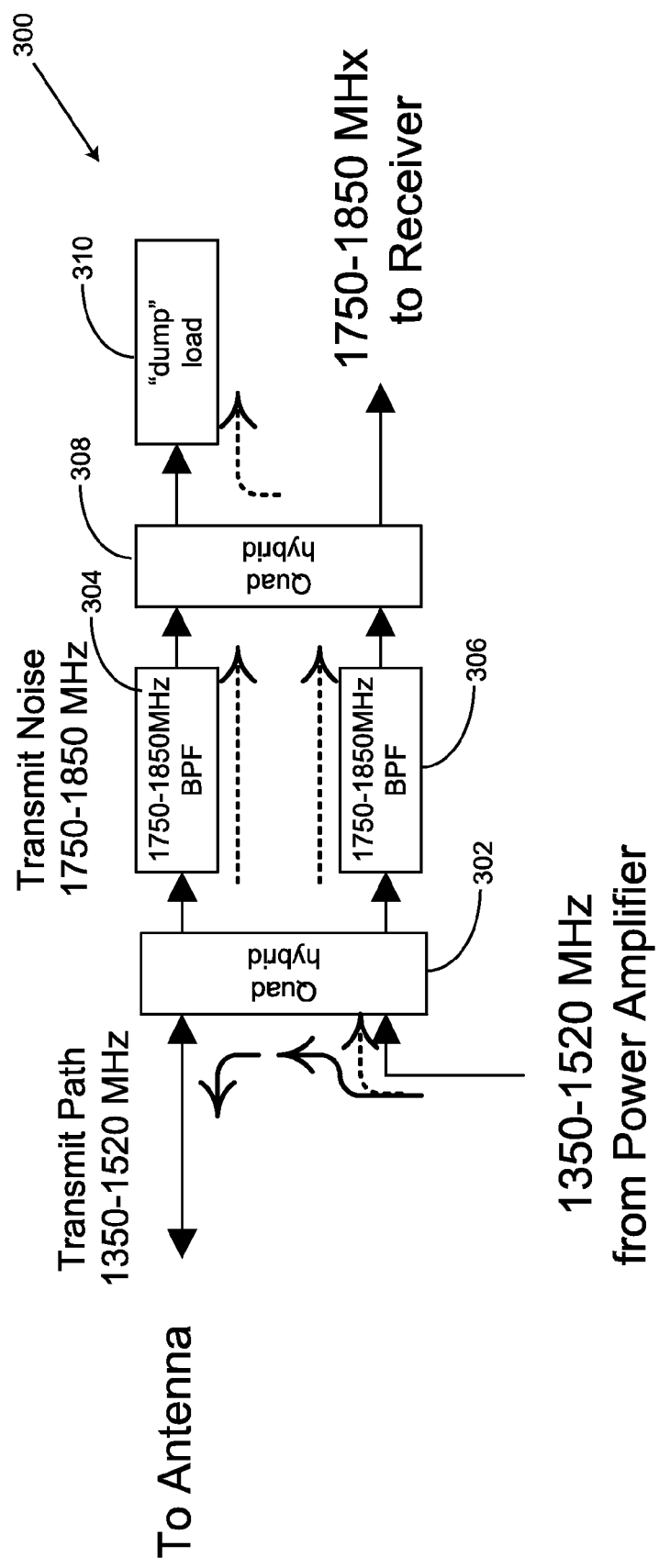
FIG. 4 is a schematic diagram of a diplexer illustrating a transmit path according to an exemplary embodiment.

Referring to FIGS. 3 and 4, schematic diagrams illustrate the signal-flow theory of operation. Referring specifically to FIG. 3, a simplified diplexer 300 is shown depicting a receive signal flow according to an exemplary embodiment. A quad-hybrid 302 receives a receive band signal from the antenna (e.g., antenna 202), for example in a band of between about 1750 MHz and about 1850 MHz. Quad-hybrid 302 may split the received signals into 90-degree quadrature components. Because diplexer 300 has received a signal, the quadrature signals are in-band to band pass filters (BPFs) 304 and 306 and travel through both BPF 304 and 306 with negligible loss. The quadrature signals are recombined in-phase at a receiver port of a second quad-hybrid 308 and provided to a receiver (e.g., transceiver 206).

Referring to FIG. 4, diplexer 300 is shown depicting a transmit signal flow according to an exemplary embodiment. Quad-hybrid 302 receives a transmit band signal from a power amplifier or transmitter (e.g., transceiver 206), for example in a band of between about 1350 MHz and about 1520 MHz. Because the transmit signal is in a different band than BPFs 304 and 306, it encounters high reflection coefficients at the inputs to both BPFs 304 and 306 and is forced to travel to the antenna port output. The transmit signal leaves quad-hybrid 302 at the antenna port (e.g., to antenna 202 for transmission). According to various exemplary embodiments, BPF 304 and/or 306 may be a ceramic resonator filter, a cavity filter, a tubular filter, or any other bandpass filter capable of filtering RF signals. BPFs 304 and 306 may have a generally high VSWR for out-of-band transmit signals, but have a generally low VSWR for in-band receive signals. Any antenna reflection of the transmit signal from the power amplifier may retrace back to the power amplifier and not enter BPFs 304 or 306 or the receiver input.

The transmit signal may generate noise in the receive band. The transmit noise in the receive band travels from quad-hybrid 302 and directly through BPFs 304 and 306. The noise travels through quad-hybrid 308 and is passed to a "dump" load or port 310 so as not to be provided to the receiver (e.g., transceiver 206). The transmit noise combines out-of-phase at the receive port, which results in substantial noise cancellation.

Figure 5:
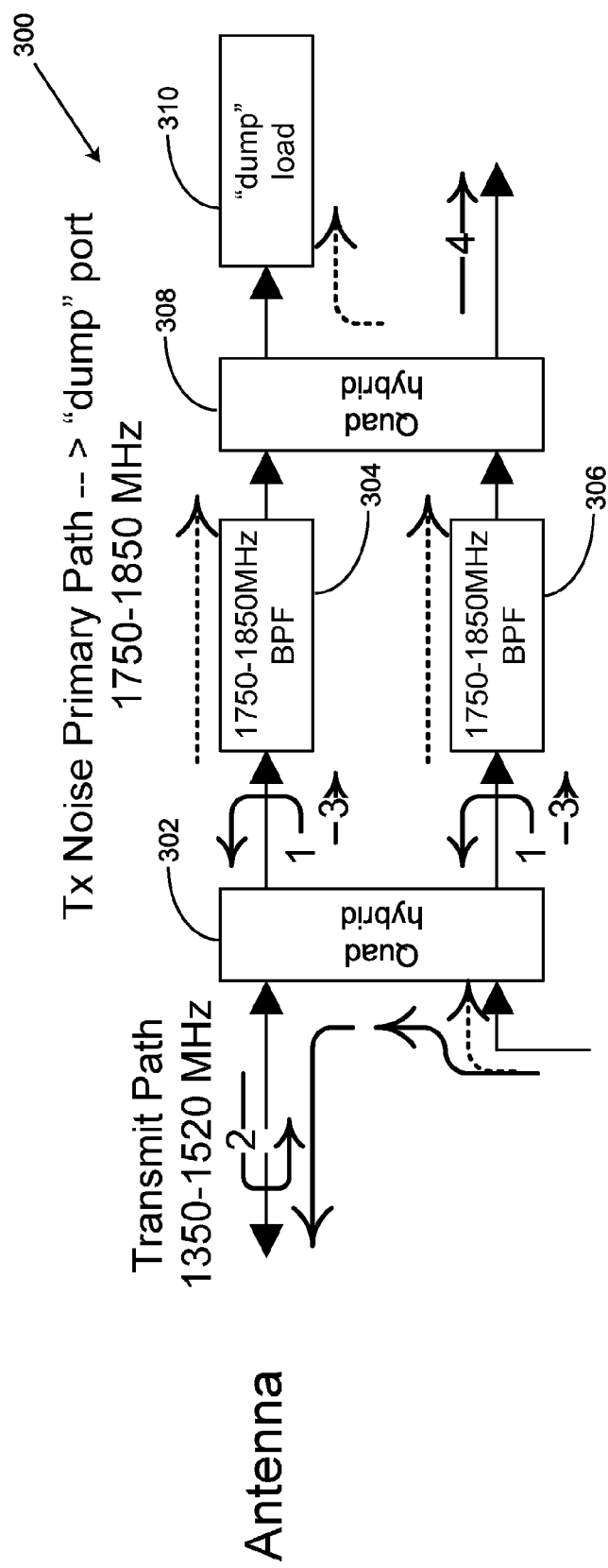
FIG. 5 is a schematic diagram of a diplexer illustrating further detail of a transmit path according to an exemplary embodiment.

FIG. 5 elaborates on the signal paths taken by transmit noise generated within the receive band and illustrates the rationale for imposing a specific S11 requirement on each of the bandpass filters. Within the transmit frequency band, each filter "reflects" the transmit signal because the transmit signal is outside of the filter passband. S11 (out-of-band, in this instance) is a measure of this reflection. With an adequate S11 requirement imposed on the bandpass filters, broadband noise isolation between the transmitter and receiver ports is set by the isolation provided in the quadrature-hybrid, which is typically about 25 dB. Even higher levels of isolation can be specified for some models of quad-hybrid directional couplers, although this may come with increased insertion losses in both transmit and receive paths.

The transmit noise "reflected" path signal flow (in-band to RX) may be as follows:
1. The transmit noise encounters a generally small VSWR at BPF 304 and 306 inputs and a small amount of noise is reflected back into quad-hybrid 302.
2. The reflected noise leaves quad-hybrid 302 at the antenna port, but encounters another VSWR reflection at the antenna. An ideal "low" VSWR antenna may yield transmit noise levels driven by the isolation specifications of quad hybrid 302.
3. Twice reflected noise travels back to BPFs 304 and 306.
4. The twice reflected noise output is additive at the receive output port. The level may exceed quad-hybrid 308 isolation characteristics if antenna VSWR is high.

The in-band reflection coefficient of BPFs 304 and 306 determine the peak level of residual transmit noise at the receive output port. An ideal "low" VSWR antenna may yield transmit noise levels driven by the isolation specifications of quad hybrid 302. Imposing an S11 requirement of 25 dB on bandpass filters 304 and 306 may reduce degradation under excessive antenna VSWR conditions.

Figure 6:
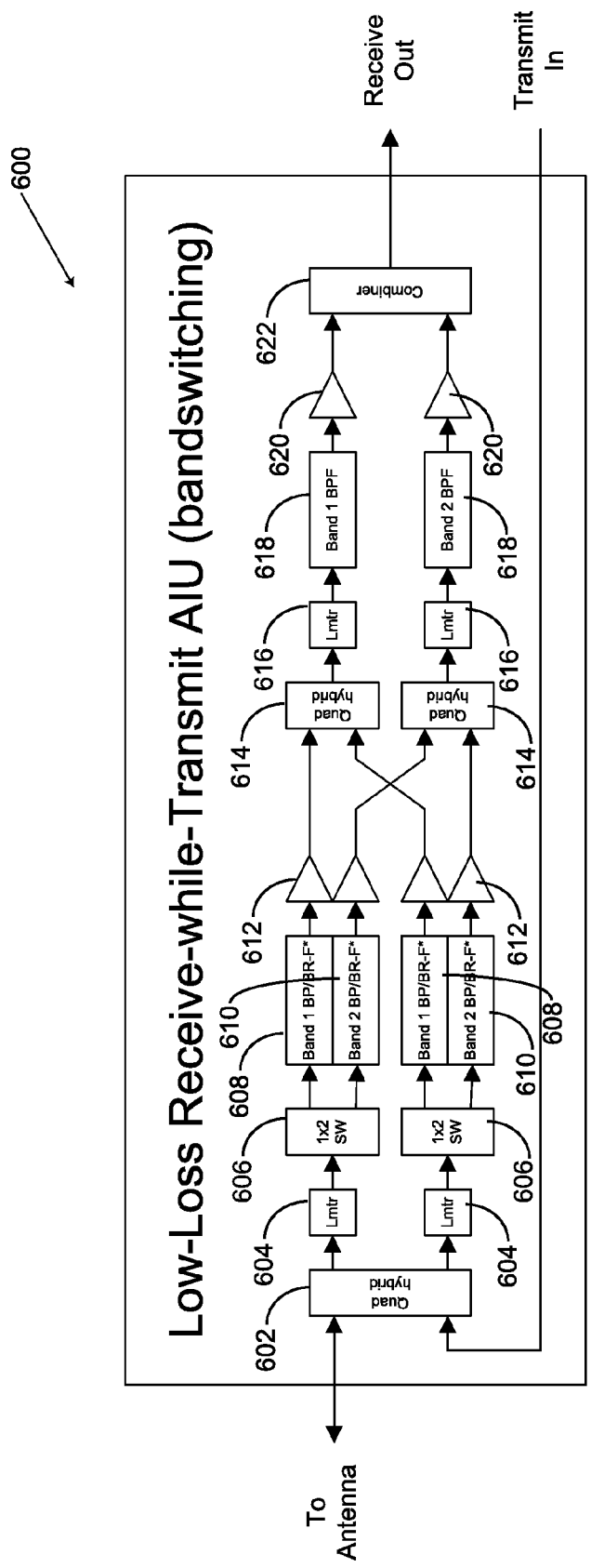
FIG. 6 is a schematic diagram of a diplexer in more detail according to an exemplary embodiment.

Referring to FIG. 6, a block diagram illustrates a diplexer 600 in greater detail according to an exemplary embodiment. Diplexer 600 includes a quad-hybrid 602 (similar to quad-hybrid 302) configured to receive a transmit signal from the transmitter (e.g., transceiver 206) and to receive a receive signal from the antenna (e.g., antenna 202). Quad-hybrid 602 steers or routes transmit signals to the antenna and steers or routes receive signals and transmit noise towards band pass filters. The signals pass through limiters 604 to control peak power level and then to a pair of two-position switches 606. Each switch 606 is coupled to a first band pass filter 608 and a second band pass filter 610 operating in a different band. Switch 606 determines which band pass filter to send the receive signal or transmit noise. According to a preferred exemplary embodiment, the switches may be discrete PIN diode switches capable of handling full transmit voltages and dissipating about 0.2 dB of power (less than 5 watts total for a 100 watt CW transmitter). According to other exemplary embodiments, one or more of switches 606 may include a PN diode switch, a MOSFET switch, a MESFET switch, or any other structure capable of switching RF signals.

Band pass filters 608 and 610 only allow signals in the corresponding band to pass through. Transmit signals do not pass through and are redirected to the antenna. The signal or noise from each BPF 608 and 610 then passes through an amplifier 612 and to a second quad-hybrid 614. Each quad-hybrid 614 is configured to steer signals from one set of band pass filters 608 or 610. Any transmit noise is sent from quad-hybrid 614 to a "dump" load (not shown). According to various exemplary embodiments, the "dump" load may be any resistor, power resistor, or other resistive load, for example a 50 ohm power resistor. The signals from quad-hybrids 614 then pass through a second limiter 616, a second BPF 618 to further reduce noise, and another amplifier 620 before reaching a combiner or sum circuit 622. Combiner 622 is configured to add the signals from the two bands together and provide the summed signal to a receiver (e.g., transceiver 206).

Each limiter described above may be replaced by a suitable diode pair, biased as appropriate to protect the amplifier immediately following it. Depending upon amplifier protection needs, actual insertion loss may be about 0.2 dB. Placement of the receive limiters at the outputs of the quad-hybrid circuitry, just prior to the low-noise-amplifier inputs, may afford low-loss readily predictable performance because of the impedance (e.g., 50 ohms) presented at that point.

Appropriate safeguards (failsafe control mechanism) may be used to ensure that the transmitter does not simultaneously operate within the same frequency band as the receiver in order to protect the receive filters from heat dissipation. As with traditional diplexers, each amplifier is already protected by a limiter. A simple and appropriate protective mechanism may be to run the already sampled transmitter output (at the amplifier) through parallel bandpass filters and force shutdown of the transmitter whenever excessive energy is present within the receive bandpass.

Figure 7:
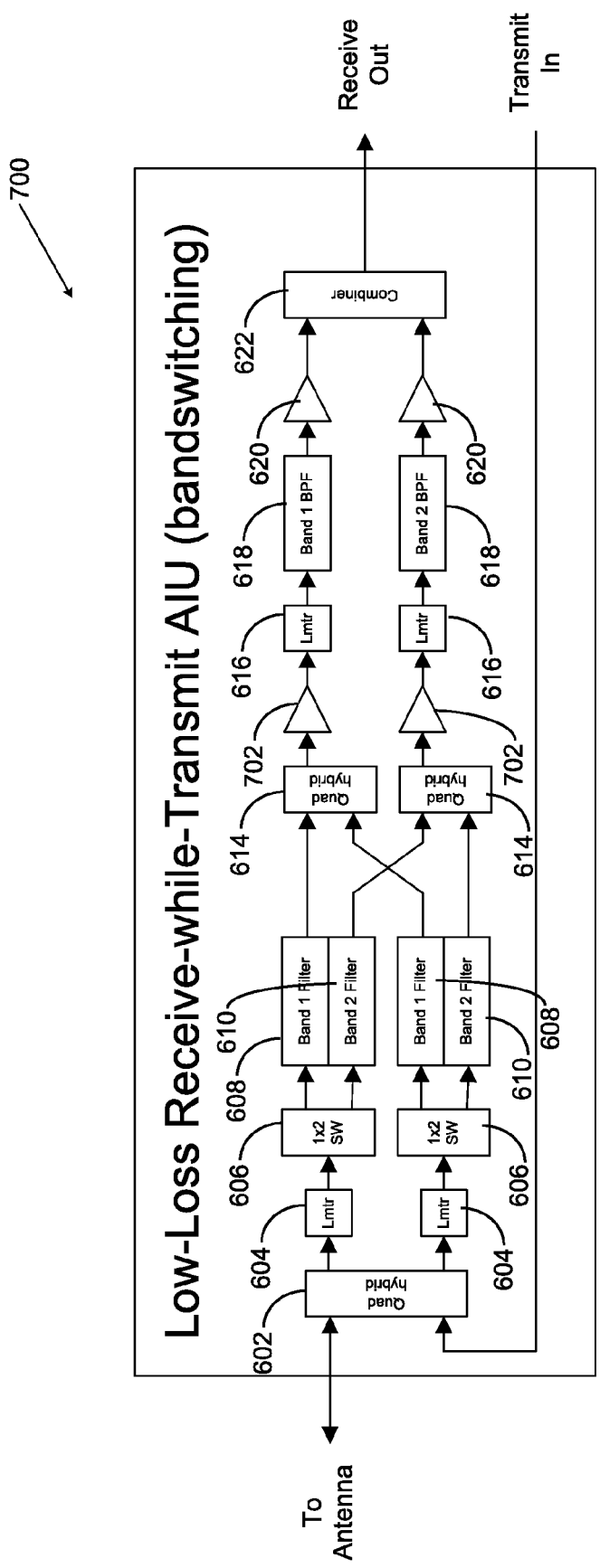
FIG. 7 is a schematic diagram of a diplexer according to another exemplary embodiment.

Referring to FIG. 7, according to another exemplary embodiment, a diplexer 700 is similar in configuration to diplexer 600, however amplifiers 612 between BPFs 608, 610 and quad-hybrids 614 are replaced with amplifiers 702 between quad-hybrids 614 and limiters 616. This placement of amplifiers 702 may result in smaller signal handling requirements and may also be cheaper with lower power because fewer amplifiers are used.

Figure 8:
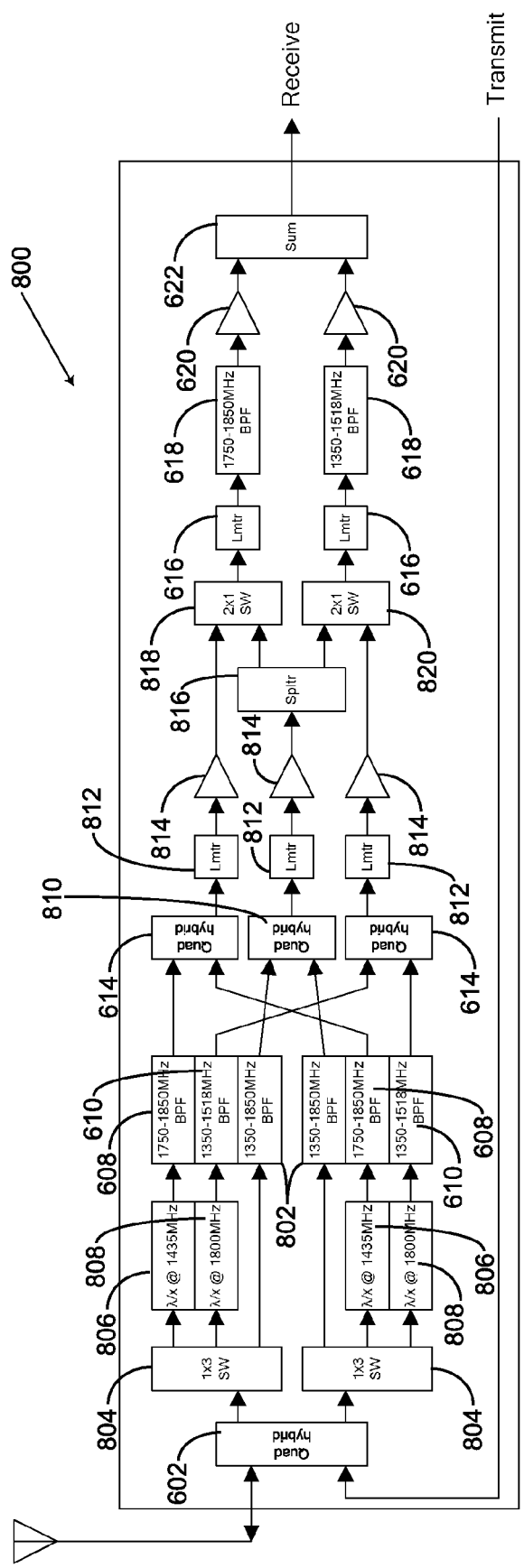
FIG. 8 is a schematic diagram of a diplexer according to another exemplary embodiment.

Referring to FIG. 8, a diplexer 800 is similar in configuration to diplexer 700, but is configured to be capable of listening to both transmit and receive bands simultaneously, according to another exemplary embodiment. A pair of band pass filters 802 is added in addition to BPFs 608 and 610. The band of the additional filter matches the transmit signal band so that the system may listen to it while simultaneously receiving. Switches 606 are replaced by three-position switches 804 to accommodate extra filters 802. Impedance transformation lines 806 and 808 may be added to transform the impedance of signals sent to each of the receive BPFs 608 and 612. BPFs 802 output to an additional quad-hybrid 810, which outputs the signal to a subsequent limiter 812, amplifier 814, and splitter 816. The splitter is configured to provide the signal from quad-hybrid 810 to a pair of switches 818 and 820, which also receive the output of quad-hybrids 608 and 610, respectively. Switches 818 and 820 determine which signals are sent to limiters 616 for subsequent further filtering and summing.

The low impedance of the filters, if not corrected for, may exacerbate resistive losses in the band-switch used to select among the appropriate receive filters. If the frequency bands used are relatively narrow (e.g., less than about 15%), correction may be made by inserting transmission lines 806 and 808 (e.g., a $\lambda/4$ transmission line) directly between filter 608 and 610 and switches 606. The $\lambda/4$ transmission lines 806 and 808 may act as an impedance transformer that rotates the impedance from very low at the filter end of the transmission line to very high at the switch end of the transmission line. In series with high impedance $\lambda/4$ transmission lines 806 and 808 the resistive switch loss may become very small. Quad-hybrid operation tends to be independent of whether the reflection presented to it is of low impedance or high impedance as long as it remains reflective. The 50 ohm insertion loss specification value for a switch may not be valid when that switch is installed in a system presenting an impedance other than 50 ohms. The series loss of the switch should be computed based on the resistive loss of the switch relative to the impedance presented by the transmission line.

According to one exemplary embodiment, minimal insertion loss attributable to the switch of 0.1 dB may be achieved at the $\lambda/4$ frequency. In percentage terms, the frequency spread from 1350-1520 MHz in L-band represents just under 12% bandwidth. A comparable 12% frequency spread may show a modest increase to 0.25 dB of switch insertion loss across this broader spectrum. Total transmit loss may be no more than 0.5 dB within either of the L-band frequency ranges without degrading receive performance or sensitivity. In neither of the frequency bands does total transmit insertion loss equal the sum of insertion losses for the individual system components. According to some exemplary embodiments, transmission lines 806 and 808 may be constructed directly on the PCB. The transmission lines have been described of length $\lambda/4$, but lengths of $\lambda/8$ and $3\lambda/8$ may also be used for other filter types. Exact length will depend on the presentation of the reflective filter impedance.

Volume limits for production may be dictated largely by the sizes of the band-pass filters. The receive-while-transmit diplexer AIU may not be much larger than the filters themselves. The electronic devices may be available in miniature surface mount versions, including the quad-hybrid directional couplers. The three position switches, for example, at the front of the assembly, may occupy a small fraction of the circuit board they are mounted on.

Figure 9:
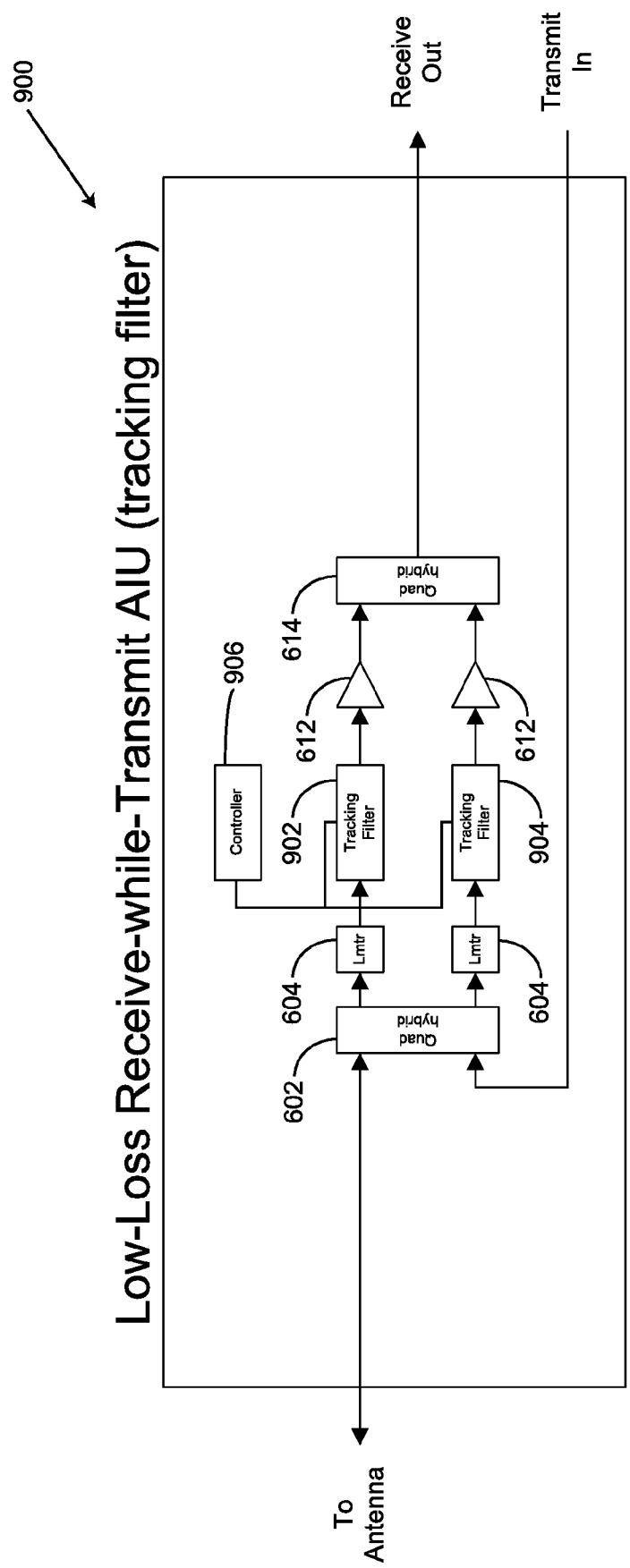
FIG. 9 is a schematic diagram of a diplexer according to another exemplary embodiment.

Referring to FIG. 9, a diplexer 900 is similar to diplexer 600, but uses a different filtering system according to another exemplary embodiment. Switches 606 and BPFs 608 and 610 are replaced with a pair of tracking filters 902 and 904. Tracking filters 902 and 904 are configured as band-pass filters that track the input signal based on an externally supplied signal from a control circuit 906. Control circuit 906 provides a signal representing the band in which the filter allows signals to pass through. Tracking filter 902 and 904 can be configured to cover any range or band based on the signal from control circuit 906. The output from tracking filters 902 and 904 is provided to a single quad-hybrid 614 as only one filter is used for each band.

Figure 10:
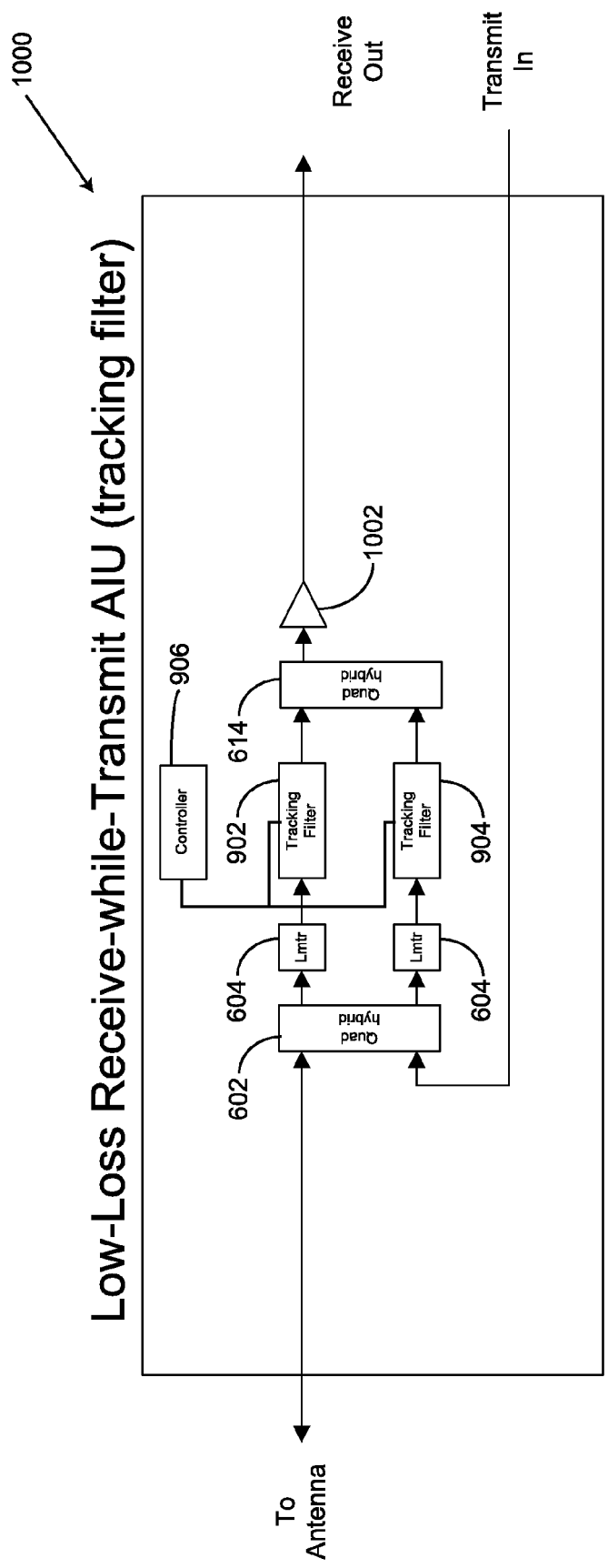
FIG. 10 is a schematic diagram of a diplexer according to another exemplary embodiment.

Referring to FIG. 10, a diplexer 1000 is similar in configuration to diplexer 900, however amplifiers 612 between tracking filters 902, 904 and quad-hybrid 614 are replaced with an amplifier 1002 between quad-hybrid 614 and the receiver. The placement of amplifier 1002 may results in smaller signals and also be cheaper with lower power because a single amplifier is used.

Bandpass filters used in the quad-hybrid diplexers described above are generally commercially available filters selected based on the following criteria:
1. Availability
2. Minimal insertion loss within the receive band
3. Sufficient skirt selectivity within transmit band to prevent or reduce receiver overload
4. Maximized reflection across the transmit band (e.g.; S11, VSWR).

While the illustrated exemplary embodiments cover a lower frequency band of 1350-1520 MHz and an upper frequency band of 1750-1850 MHz, according to other exemplary embodiments, any band may be used for receive and/or transmit signals. According to some exemplary embodiments, cavity filter insertion may be appreciably lower than that of the ceramic-resonator filters. Considerable improvement in performance of ceramic-resonator filters may be achieved by using larger resonator sizes. When larger resonators are used, the performance of ceramic-resonator filters can approach that which was attained with the cavity filters, while still maintaining a considerable size advantage compared to cavity filters. For example, performance of 12 cm ceramic-resonator filters for the frequency bands described may approach the performance of the cavity filters. The filter pair may be configured to maintain phase tracking and alignment across the filter passbands. Phase misalignment may shunt a significant amount of signal power into the "dump" port load of the output quad-hybrid, thereby increasing insertion loss. The phase issue may be controllable by imposing a group delay variation specification on the individual filters, a common practice for filters used in data transmission systems.

One function provided by any diplexer is minimization of transmit carrier amplitude at the receiver input in order to prevent receiver damage and de-sensing. The quad-hybrid diplexer of the exemplary embodiments may offer excellent rejection of the transmit signal, which is generally greater than 80 dB. This characterization of excellent performance may be realized for both the low-loss cavity filters and the miniature ceramic-resonator filters. Filter losses under 0.3 dB across the entire band may be possible with such filters, putting the 12 cm ceramic filters on par with the much larger cavity filters. Improvement in return loss (S11) to about 25 dB may also be possible with the 12 cm ceramic filters. This results in isolation performance being on par with isolation provided by the quad-hybrid. With 25 dB of isolation being the "typical" limitation of quadrature-hybrid assemblies, there may be little benefit to using filters exhibiting return loss better than 25 dB. An alternative ceramic-resonator filter is an 8 cm ceramic-resonator filter. These smaller filters offer low insertion loss of around 0.5 dB, while still supporting 25 dB return loss, but using only slightly more volume than the 6 cm filters employed for evaluation.

The quad-hybrid diplexer may generally provide over 20 dB of isolation to the receiver from broadband noise generated by the transmitter. Exception to this may be observed, however, in cases of extreme antenna VSWR. With full reflection from the antenna, isolation has been observed to drop as low as 13 dB. Resolution of this low isolation value can be achieved by imposing an in-band S11 requirement on the bandpass filters. With no reflection from the bandpass filters, isolation in the quad-hybrid is typically around 25 dB. Imposing a value of 25 dB for S11 on the bandpass filters may yield equivalent levels (under worst-case high-VSWR conditions) from each of the two sources of noise leakage.

Typically, in-band S11 is not an explicitly stated filter requirement. Filter vendors frequently characterize "typical" S11 performance, even if not an explicitly stated requirement however, and vendors are willing to impose a specific requirement upon request. Achieving an S11 value of 25 dB is readily attainable with the preferred 12 cm ceramic-resonator filters. The trade-off is that reduction in S11 uses a slightly higher filter order in order to maintain the same selectivity because reduced S11 is associated with reduced in-band amplitude ripple.

When the "receive" bandpass filter provides a very low value of S11 in the transmit band, the filter may have a minimal transmit signal loss because nearly all power is reflected away from the filter. Typical filter design accomplishes this signal reflection by providing a very low shunt impedance to ground. Both the cavity filters and the ceramic-resonator filters may exhibit S11 values well below 0.05 dB, a value sufficiently low where negligible losses to the transmit signal occur within the filter. Although transmit losses of up to 0.3 dB may be observed, these losses are typically losses occurring within the quad-hybrids.

It is noted that 20-25 dB of noise isolation is considerably lower than the value of 50 dB, which has been expected from conventional diplexer designs. The design implication of an isolation value of 20 dB is that such an amount of isolation is sufficient to overcome noise and distortion generated within a typical 10-13 dB gain final amplifier stage (including intermodulation distortion effects), but insufficient to overcome noise and distortion generated by the driver and lower-level amplifier stages in a transmitter. Consequently, when employing a quad-hybrid diplexer sufficient broadband noise filtering is provided at the input to the final amplifier stage to eliminate or reduce noise and distortion generated by lower level amplifier stages.

Such filtering is already a common design practice in many amplifiers that achieve low levels of distortion and noise. For efficiency reasons, filtering should be performed at the final amplifier input instead of filtering the amplifier output, because maximum efficiency and minimum size are often among the most important requirements for a power amplifier. Even when a conventional diplexer is used, filtering at the final amplifier input may simplify diplexer design and minimize diplexer insertion loss, thereby maximizing overall system power-efficiency.

Parity with conventional diplexers in regards to noise isolation can be accomplished using additional filtering. For example, a "notch" filter (e.g., a band-pass filter) arrangement can be employed using the quad-hybrid diplexer design described above and the "Band Rejection Filtering Arrangement" design described in U.S. Pat. No. 4,963,945, which is herein incorporated by reference in its entirety.

Figure 11:
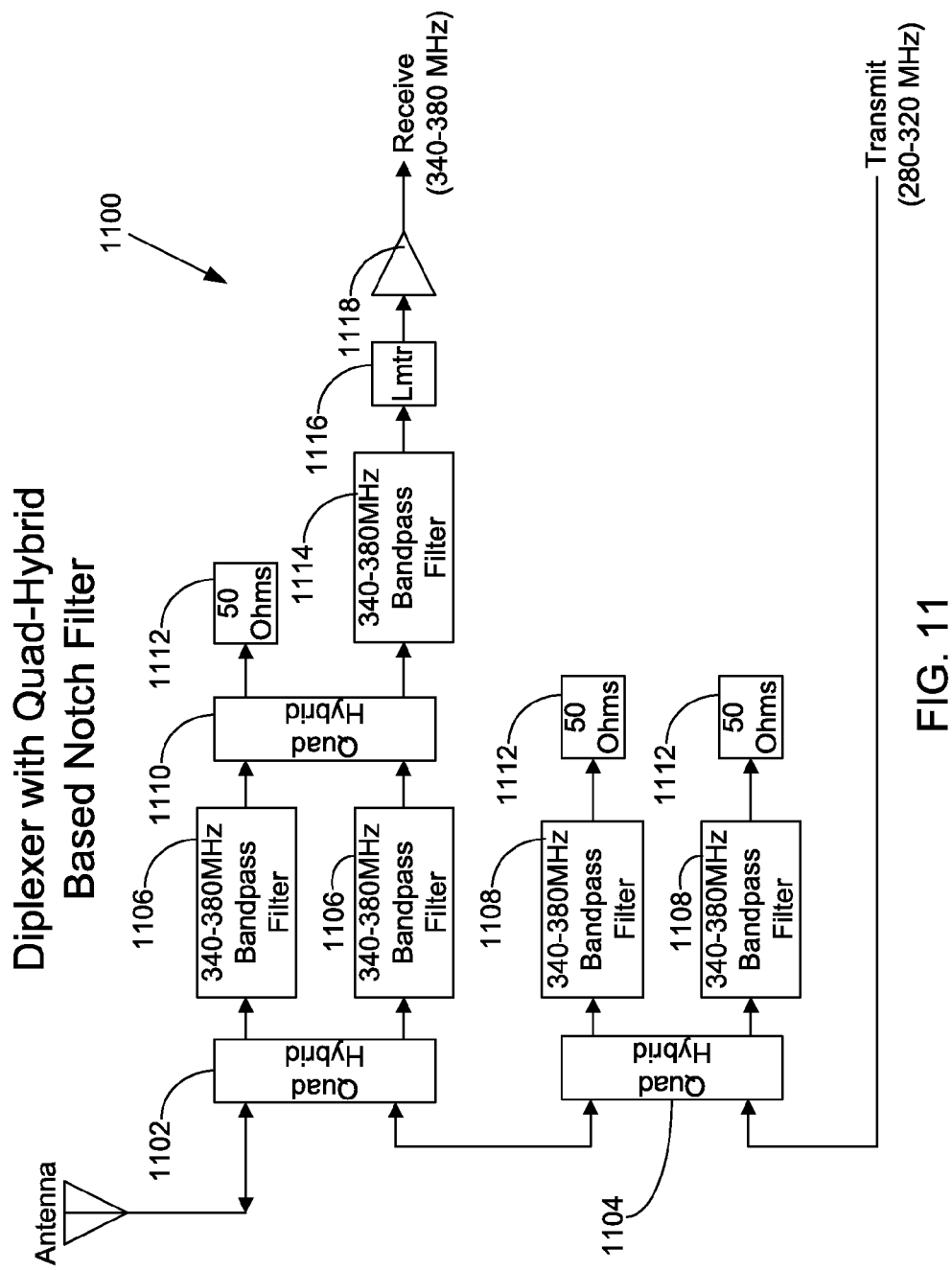
FIG. 11 is a schematic diagram of a diplexer according to another exemplary embodiment.

Referring to FIG. 11, a diplexer 1100 includes a quad-hybrid based notch or band-pass filter according to an exemplary embodiment. Diplexer 1100 is similar to the quad-hybrid diplexers of FIGS. 6-10 in regards to transmit signal flow and may have a similar amount of low loss. Diplexer 1100 includes two quad-hybrids 1102 and 1104 configured to route a transmit signal from the transmitter (e.g., transceiver 206) and to route a receive signal from the antenna (e.g., antenna 202). Each of quad-hybrids 1102 and 1104 steer or route transmit signals to the antenna and steer or route receive signals and transmit noise towards a pair of notch or band-pass filters 1106 or 1108.

Band pass filters 1106 and 1108 only allow signals within the corresponding band to pass through the filters, for example by allowing signals or noise having frequencies between about 340 MHz and about 380 MHz to pass through. Transmit signals having frequencies between about 280 MHz and about 320 MHz do not pass through filter pairs 1106 or 1108, and instead are redirected to the antenna. The signal or noise that passes through filter pair 1106 is routed to a third quad-hybrid 1110 configured to steer signals from filters 1106. Any transmit noise is sent from quad-hybrid 1110 to a "dump" load 1112, for example a 50 Ohm load. The "receive" signals from quad-hybrid 1110 then pass through another filter 1114 to further reduce noise and interference, a limiter 1116 to reduce voltage spikes, and an amplifier 1118 before being sent to the receiver. The signal or noise from filter pair 1108 is routed to at least one "dump" load 1112, for example a 50 Ohm load.

Filters 1108 can be similar to filters 1106, although they need not be. Filters 1108 can be simpler than filters 1106 because insertion loss of filters 1108 may be inconsequential. One performance parameter for filters 1108 is S11 and consequently complexity, size, and cost can be lower for these filters. The amount of noise filtering provided with arrangement 1100 may be better than the isolation values discussed earlier. Because noise with this approach is dissipated without crossing into the receive channel and because the transmit signal passes through two noise filtering gates at quad-hybrids 1102 and 1104, total noise rejection better than 25 dB can be achieved from a quad-hybrid notch filter arrangement, which is slightly better than the quad-hybrid isolation specification values of FIGS. 6-10. Total system noise isolation for quad-hybrid notch/diplexer combination 1100 may be about 50 dB, which is similar to conventional diplexer noise isolation performance requirements. Total insertion loss for a combined quad-hybrid diplexer and quad-hybrid notch-filter may be double the insertion loss of the quad-hybrid diplexer alone. Nevertheless, there may be instances where performance equivalency with a conventional diplexer is desired.

Noise isolation is one area where a quad-hybrid diplexer may offer less performance than a conventional diplexer. If after review of the system, it is determined that additional isolation is needed within the quad-hybrid diplexer rather than reallocating noise improvements to the power amplifier, one way of accomplishing this in a power-efficient and space-efficient manner is to "notch" the noise with another hybrid/filter combination.

According to various exemplary embodiments, the proposed solution involves "steering" the transmit signal through a low-loss quadrature hybrid via low-power frequency agile filters on two of its four ports. The frequency agile receive filters are off-frequency from the transmitter and steer the transmit signal through the hybrid to the antenna port with very low loss, while also serving as input filters to the low-noise receiver front-end. For example, a conventional diplexer may have about a 1.5 dB transmit loss and about 1.5 dB receive loss. The transmit loss may be reduced to less than about 0.5 dB while overall receive loss, including switching circuits, may be reduced to about 0.5 dB. Further, the steering circuitry (e.g., PIN diodes) can be much faster because the switching devices need handle only small amounts of power. The quadrature hybrid effectively shelters the steering circuitry from the large power levels of the transmitted signal being steered through the opposite pair of ports in the quadrature-hybrid.

The noise may be minimized with this approach because the in-band noise from the transmitter/power amplifier is not sent to the antenna, but rather is diverted through a pair of low-noise receive amplifiers and on to the "dump" port of the output quadrature-hybrid. In other words, transmit/power amplifier noise signal phasing produces an output at the opposite port of the hybrid from the one used for receive. This allows the same low-noise receive result as about 20-30 dB of filtering placed directly on the power amplifier output, but without the associated losses. In many cases no bandpass filtering may be needed at the power amplifier output for full-duplex operation. Filtering may still be needed prior to the final amplifiers, but filtering the lower power circuits is easier and more power-efficient.

Another advantage is that power dissipation is reduced to less than one-third of that used with a conventional diplexer arrangement. The large reduction in dissipated power results from the fact that the transmit signal path need not include any filtering. Although filtering is still used to isolate the receiver front-end from the transmitter, that filtering can be accomplished in the receive path at a relatively low power level. For example, a 200 watt system may dissipate more than 80 watts in a conventional diplexer, and demand significant cooling resources. In comparison, a diplexer according to various exemplary embodiments herein may dissipate less than about 25 watts. This directly correlates with corresponding size and weight reductions, at least for air-cooled systems where size and weight are generally proportional to heat dissipation. Additional size reductions may come about because the low-power receive filters can be much smaller than potential diplexer filters. Conventional diplexers may be displaced given the smaller, lighter, more efficient, and lower cost attributes of the exemplary embodiments described. The favorable attributes of the exemplary embodiments allow the diplexer to be applicable to any receive-while-transmit system.

Insertion loss can be traded off with size in quad-hybrid diplexers. Receive filters tend to be the largest components in a quad-hybrid diplexer and the receive loss is generally inversely-proportional to filter size. Receive filter size may have little impact on transmit loss, which is primarily controlled by the quad-hybrid. Smaller quad-hybrids tend to show greater insertion loss.

The one area in which the hybrid-based approach may not achieve equivalency with conventional band-pass diplexer designs is broadband noise filtering, including harmonic reduction. Arguably, however, this wideband noise filtering is an inadvertent benefit provided only by band-pass filter diplexer designs as the common high-pass/low-pass diplexer design does not accomplish wideband noise filtering. The hybrid-based approach provides no wideband filtering, although considerable noise-filtering within the receive band may be provided. For many or perhaps even most applications, the lack of wideband filtering may be of no particular consequence. This is underscored by the fact that conventional diplexers using high-pass/low-pass filter architecture do not accomplish wideband noise filtering either. Per conventional design practice, when using a quad-hybrid diplexer the transmitter includes a harmonic filter. Transmit noise performance outside the receive band may remain equivalent to that of a conventional transmitter.

The ability to accomplish high-power switching with near-negligible switching loss (e.g., about 0.1 dB) is a major advantage offered by the quad-hybrid diplexer. This result may be achieved by using low-cost commercial switches (e.g., 0.65 dB @ 50Ω) in conjunction with low-cost quarter-wave transmission lines performing the necessary impedance transformations. This technique is both readily reproducible and scalable in regards to power and frequency. Total transmit loss can be reduced even further to 0.5 dB or less across the entire transmit band when using standard practice circuit-board design techniques for implementation.

Inherent isolation provided by the quad-hybrid may allow use of low-power miniature receive filters. This capability is perceived to be a major advantage for the quad-hybrid diplexer in many applications because extreme miniaturization of the diplexer with little or no performance penalty becomes possible, for example an overall volume of under about five cubic-inches. A full power quad-hybrid based design may have a total volume about only one or two cubic inches while achieving equivalent performance to a conventional diplexer. Orders of magnitude reduction in diplexer size appear possible using the proposed technique. This is attainable because 1) no direct filtering of the high-power transmit channel is required, as would be the case with a conventional diplexer, and 2) as a result, heat dissipation is small. Because transmit power is, for practical purposes, completely reflected at the input of the filters, very small "receive" filters can be used. The filters themselves dissipate virtually no power. The small amount of transmit power which is absorbed is dissipated in either the quadrature-hybrid or one of the band switches, but neither of these device types grows in size as a result of needing to dissipate power. Fast frequency hopping is supported by switching between pairs of filters, which allows the transmitter and receiver to operate across multiple frequencies by hopping from one frequency to another.

A summary chart comparing the quad-hybrid based diplexer against conventional diplexers is provided below:

| Parameter | Quad-hybrid Diplexer Advantage | Band-pass Diplexer Advantage | Hi-pass/ Low-pass Diplexer Advantage |
|---|---|---|---|
| Transmit Loss | About half the loss | | |
| Power Dissipation | Lower power dissipation: About 5% to about 10% vs about 15% to about 40% | | |
| Receive Loss | Lower-loss, less complex receive filters | | |
| Carrier rejection | About 25 dB advantage | | |
| Transmit noise isolation | (Equivalency if hybrid-based notch filter added) | Approximately 25 dB advantage for TTNT | Approximately 25 dB advantage for TTNT |
| Broadband Noise Rejection | | Advantage on both sides of spectrum | Advantage on one side of spectrum only |
| Band-switching | Simple, small, low power, low loss implementation | | |
| Size | Greater than about 75% size reduction | | |

-continued

| Parameter | Quad-hybrid Diplexer Advantage | Band-pass Diplexer Advantage | Hi-pass/ Low-pass Diplexer Advantage |
|---|---|---|---|
| Weight | Light weight due to small size. | | |
| Reliability | Lower heat dissipation => improved reliability | | |
| Duty Cycle | Continuous duty cycle possible for TTNT | | |
| Cost | About half the cost | | |

While the detailed drawings, specific examples, detailed algorithms and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the communications devices. For example, the type of system components and their interconnections may differ. The systems and methods depicted and described are not limited to the precise details and conditions disclosed. The figures show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A diplexer for steering transmit and receive signals between an antenna and a transmitter and receiver of a radio frequency communication system, the diplexer comprising: a first quadrature hybrid device configured for bidirectional communication with the antenna and configured for routing transmission signals from the transmitter; at least one pair of filters coupled to quadrature ports of the first quadrature hybrid device, the at least one pair of filters providing a receive signal from the antenna via the first quadrature hybrid device for a receive path and reflecting a transmit signal from the transmitter via the first quadrature hybrid device for a transmit path, the at least one pair of filters configured to filter out noise from the receive signal and allow noise through from the transmit signal; and a second quadrature hybrid device configured to receive the outputs from each of the at least one pair of filters, the second quadrature hybrid device providing the filtered receive signal to the receiver or providing the noise from the transmit signal to a load, wherein the transmit signal is in a frequency range between 1350-1520 MHz and the receive signal is in a range between 1750-1850 MHz.

2. The diplexer of claim 1, wherein the at least one pair of filters comprises two band pass filters configured to filter the same bandwidth, each band pass filter coupled to a separate quadrature output of the first quadrature hybrid device.

3. The diplexer of claim 1, wherein the at least one pair of filters comprises at least one of a band pass filter pair, a tracking filter pair, and a notch filter pair.

4. A diplexer for steering transmit and receive signals between an antenna and a transmitter and receiver of a radio frequency communication system, the diplexer comprising: a first quadrature hybrid device configured for bidirectional communication with the antenna and configured for routing transmission signals from the transmitter; at least one pair of filters coupled to quadrature ports of the first quadrature hybrid device, the at least one pair of filters providing a receive signal from the antenna via the first quadrature hybrid device for a receive path and reflecting a transmit signal from the transmitter via the first quadrature hybrid device for a transmit path, the at least one pair of filters configured to filter out noise from the receive signal and allow noise through from the transmit signal; a second quadrature hybrid device configured to receive the outputs from each of the at least one pair of filters, the second quadrature hybrid device providing the filtered receive signal to the receiver or providing the noise from the transmit signal to a load; and a first pair of switching devices coupled to quadrature outputs of the first quadrature hybrid device, wherein each of the at least one pair of filters comprises two band pass filters coupled to the first pair of switching devices, a first pair of filters configured to filter for a first receive frequency and a second pair of filters for a second receive frequency, the first pair of filters providing filtered signals to the second quadrature hybrid device and the second pair of filters providing filtered signals to a third quadrature hybrid device, the switching device configured to switch between the filter pairs based on a desired frequency of operations; and a summation circuit configured to combine the signals from the second and third quadrature hybrid devices for output to the receiver, to a load, or to a switch circuit configured to switch between output signals from the second and third quadrature hybrid devices for output to the receiver or to a load.

5. The diplexer of claim 4, further comprising:
  a third pair of band pass filters in parallel with the first and second pair of filters;
  a fourth quadrature hybrid device coupled to the outputs of the third pair of band pass filters, and
  a summation circuit configured to receive filtered signals from the second, third, and fourth quadrature hybrid devices for output to the receiver or to a load; or a pair of switching devices configured to switch between quadrature ports from the second and fourth quadrature hybrid devices for output to the receiver or to a load,
  wherein the diplexer can listen to both transmit and receive bands.

6. The diplexer of claim 1, further comprising: an amplifier coupled between each of the at least one pair of filters and the second quadrature hybrid device or coupled to each output of the second, third or fourth quadrature hybrid device.

7. The diplexer of claim 1, wherein the diplexer is configured to operate in a full-duplex mode.

8. The diplexer of claim 1, further comprising:
  at least one filter coupled between the second quadrature hybrid device and the receiver.

9. The diplexer of claim 1, further comprising:
  a limiter circuit coupled between each of the at least one pair of filters and the second quadrature hybrid device or coupled to each output of the second quadrature hybrid device to prevent voltage spikes.

10. The diplexer of claim 1, wherein the band pass fillers have a range of 1750 to 1850 MHz.

11. A diplexer for steering transmit and receive signals between an antenna and a transmitter and receiver of a radio frequency communication system, the diplexer comprising: a first quadrature hybrid device configured for bidirectional communication with the antenna and configured for routing transmission signals from the transmitter; at least one pair of filters coupled to quadrature ports of the first quadrature hybrid device, the at least one pair of filters providing a receive signal from the antenna via the first quadrature hybrid device for a receive path and reflecting a transmit signal from the transmitter via the first quadrature hybrid device for a transmit path, the at least one pair of filters configured to filter out noise from the receive signal and allow noise through from the transmit signal; and a second quadrature hybrid device configured to receive the outputs from each of the at least one pair of filters, the second quadrature hybrid device providing the filtered receive signal to the receiver or providing the noise from the transmit signal to a load, wherein the total transmit loss is less than 0.3 dB, the receive loss is less than 1.0 dB, and the volume of the diplexer is less than 2.0 cubic inches.

12. An antenna interface unit for multiplexing transmit and receive signals between an antenna and a transmitter and receiver of a radio frequency communication system, comprising: a first quadrature hybrid device configured for bidirectional communication with the antenna and configured for routing transmission signals from the transmitter; at least one pair of filters coupled to quadrature ports of the first quadrature hybrid device, the at least one pair of filters providing a receive signal from the antenna via the first quadrature hybrid device for a receive path and reflecting a transmit signal from the transmitter via the first quadrature hybrid device for a transmit path, the at least one pair of filters configured to filter out noise from the receive signal and allow noise through from the transmit signal, wherein the transmit signal is in a frequency range between 1350-1520 MHz and the receive signal is in a range between 1750-1850 MHz; and a second quadrature hybrid device configured to receive the outputs from each of the at least one pair of filters, the second quadrature hybrid device providing the filtered receive signal to the receiver or providing the noise from the transmit signal to a load.

13. The antenna interface unit of claim 12, wherein the at least one pair of filters comprises at least one of a band pass filter pair, a tracking filter pair, and a notch filter pair.

14. The antenna interface unit of claim 12, wherein the at least one pair of filters comprises two band pass filters configured to filter the same bandwidth, each band pass filter coupled to a separate quadrature output of the first quadrature hybrid device.

15. An antenna interface unit for multiplexing transmit and receive signals between an antenna and a transmitter and receiver of a radio frequency communication system, comprising: a first quadrature hybrid device configured for bidirectional communication with the antenna and configured for routing transmission signals from the transmitter; at least one pair of filters coupled to quadrature ports of the first quadrature hybrid device, the at least one pair of filters providing a receive signal from the antenna via the first quadrature hybrid device for a receive path and reflecting a transmit signal from the transmitter via the first quadrature hybrid device for a transmit path, the at least one pair of filters configured to filter out noise from the receive signal and allow noise through from the transmit signal; a second quadrature hybrid device configured to receive the outputs from each of the at least one pair of filters, the second quadrature hybrid device providing the filtered receive signal to the receiver or providing the noise from the transmit signal to a load; and a first pair of switching devices coupled to quadrature outputs of the first quadrature hybrid device, wherein each of the at least one pair of filters comprises two band pass filters coupled to the first pair of switching devices, a first pair of filters configured to filter for a first receive frequency and a second pair of filters for a second receive frequency, the first pair of filters providing filtered signals to the second quadrature hybrid device and the second pair of filters providing filtered signals to a third quadrature hybrid device, the switching device configured to switch between the filter pairs based on a desired frequency of operations; and a summation circuit configured to combine the signals from the second and third quadrature hybrid devices for output to the receiver or to a load, or a switch circuit configured to switch between output signals from the second and third quadrature hybrid devices for output to the receiver or to a load.

16. The antenna interface unit of claim 15, further comprising:
a third pair of band pass filters in parallel with the first and second pair of filters;
a fourth quadrature hybrid device coupled to the outputs of the third pair of band pass filters; and
a summation circuit configured to receive filtered signals from the second, third, and fourth quadrature hybrid devices for output to the receiver or to a load; or a pair of switching devices configured to switch between output ports from the second, third, and fourth quadrature hybrid devices for output to the receiver or to a load,
wherein the antenna interface unit can listen to both transmit and receive bands.

17. The antenna interface unit of claim 12, further comprising:
an amplifier coupled between each of the at least one pair of filters and the second quadrature hybrid device or coupled to each output of the second, third, or fourth quadrature hybrid device.

18. The antenna interface unit of claim 12, wherein the antenna interface unit is configured to operate in a full-duplex mode.

19. The antenna interface unit of claim 12, further comprising:
at least one filter coupled between the second quadrature hybrid device and the receiver.

20. A full-duplex multiplexer for steering transmit and receive signals between an antenna and a transceiver of a radio frequency communication system, the full-duplex multiplexer comprising: a first quadrature hybrid device configured for bidirectional communication with the antenna and configured for routing transmission signals from the transceiver; at least one pair of filters coupled to quadrature ports of the first quadrature hybrid device, the at least one pair of filters providing a receive signal from the antenna via the first quadrature hybrid device for a receive path and reflecting a transmit signal from the transmitter via the first quadrature hybrid device for a transmit path, the at least one pair of filters configured to filter out noise from the receive signal and allow noise through from the transmit signal; and a second quadrature hybrid device configured to receive the outputs from each of the at least one pair of filters, the second quadrature hybrid device providing the filtered receive signal to the receiver or providing the noise from the transmit signal to a load, wherein the total transmit loss is less than 0.3 dB, the receive loss is less than 1.0 dB, and the volume of the full-duplex multiplexer is less than 2.0 cubic inches.

* * * * *